(12) United States Patent
Inoue et al.

(10) Patent No.: US 10,304,630 B2
(45) Date of Patent: May 28, 2019

(54) CERAMIC ELECTRONIC COMPONENT AND MANUFACTURING METHOD THEREFOR

(71) Applicant: Murata Manufacturing Co., Ltd., Nagaokakyo-shi, Kyoto-fu (JP)

(72) Inventors: Mitsunori Inoue, Nagaokakyo (JP); Tomohiko Mori, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 141 days.

(21) Appl. No.: 14/804,633

(22) Filed: Jul. 21, 2015

(65) Prior Publication Data
US 2016/0024346 A1  Jan. 28, 2016

(30) Foreign Application Priority Data

Jul. 28, 2014 (JP) ................. 2014-153076

(51) Int. Cl.
| | | |
|---|---|---|
| H01G 4/002 | (2006.01) | |
| H01G 4/12 | (2006.01) | |
| H01G 4/30 | (2006.01) | |
| C09D 183/00 | (2006.01) | |
| C09D 133/00 | (2006.01) | |
| C09D 127/08 | (2006.01) | |
| C09D 163/00 | (2006.01) | |

(Continued)

(52) U.S. Cl.
CPC ............. *H01G 4/30* (2013.01); *C09D 133/08* (2013.01); *C09D 163/00* (2013.01); *C25D 5/34* (2013.01); *H01C 1/1406* (2013.01); *H01C 1/1413* (2013.01); *H01C 7/021* (2013.01); *H01C 7/041* (2013.01); *H01C 7/10* (2013.01); *H01C 17/281* (2013.01); *H01F 17/0033* (2013.01); *H01G 4/1209* (2013.01); *H01G 4/224* (2013.01); *H01G 4/232* (2013.01); *C09D 183/04* (2013.01); *C25D 5/022* (2013.01); *C25D 5/12* (2013.01); *H01G 4/0085* (2013.01)

(58) Field of Classification Search
CPC . H01G 4/30; H01G 4/12; H01G 4/002; C09D 133/00; C09D 183/00; C09D 127/08; C09D 163/00
USPC .......... 361/321.1, 301.4, 306.1, 321.2, 301.1
See application file for complete search history.

(56) References Cited

U.S. PATENT DOCUMENTS 4,555,746 A * 11/1985 Mochizuki ............... H01G 4/18
361/309
6,171,644 B1   1/2001 Jinno et al.
(Continued)

FOREIGN PATENT DOCUMENTS

| | | | | |
|---|---|---|---|---|
| CN | 1178030 A | 4/1998 | | |
| DE | 10201206371 A1 * | 11/2013 | ........... | G01F 4/2325 |
| JP | H05-237457 A | 9/1993 | | |
| JP | H06-329877 A | 11/1994 | | |
| JP | H11-209458 A | 8/1999 | | |
| JP | 2000030911 A | 1/2000 | | |

(Continued)

Primary Examiner — Eric W Thomas
Assistant Examiner — Arun Ramaswamy
(74) Attorney, Agent, or Firm — Arent Fox LLP

(57) ABSTRACT

A ceramic electronic component that includes a ceramic element, and a coating film and external electrodes that are provided on the surface of the ceramic element. The coating film is selectively formed on the surface of the ceramic element by applying, to the ceramic electronic component, a resin-containing solution containing at least one anion of a sulfuric acid, a sulfonic acid, a carboxylic acid, a phosphoric acid, a phosphoric acid, and a hydrofluoric acid.

10 Claims, 4 Drawing Sheets

(51) Int. Cl.
| | |
|---|---|
| *C25D 5/34* | (2006.01) |
| *H01C 7/10* | (2006.01) |
| *H01C 1/14* | (2006.01) |
| *H01C 7/02* | (2006.01) |
| *H01C 7/04* | (2006.01) |
| *H01C 17/28* | (2006.01) |
| *H01G 4/224* | (2006.01) |
| *H01G 4/232* | (2006.01) |
| *C09D 133/08* | (2006.01) |
| *H01F 17/00* | (2006.01) |
| *H01G 4/008* | (2006.01) |
| *C25D 5/02* | (2006.01) |
| *C25D 5/12* | (2006.01) |
| *C09D 183/04* | (2006.01) |

(56) References Cited

U.S. PATENT DOCUMENTS

| | | | |
|---|---|---|---|
| 6,214,685 | B1 | 4/2001 | Clinton et al. |
| 2001/0035810 | A1 | 11/2001 | Heistand, II |
| 2002/0050909 | A1 | 5/2002 | Jinno |
| 2010/0067168 | A1 | 3/2010 | Summers et al. |
| 2012/0236459 | A1* | 9/2012 | Ohira .................. H01F 17/0013 361/270 |

FOREIGN PATENT DOCUMENTS

| | | |
|---|---|---|
| JP | 2004-500719 A | 1/2004 |
| KR | 1019980703131 A | 10/1998 |
| KR | 20090087961 A | 8/2009 |

* cited by examiner

CERAMIC ELECTRONIC COMPONENT AND MANUFACTURING METHOD THEREFOR

BACKGROUND OF THE INVENTION

1. Field of the Invention

The present invention relates to a ceramic electronic component and a method for manufacturing the component.

2. Description of the Related Art

The ceramics for use in electronic components may be likely to be weakened against chemical erosion by acid or alkali, and also undergo a decrease in mechanical strength of themselves, because of improvements in material due to the sophisticated functions of the electronic components.

Therefore, as measures against this situation, techniques have been proposed for coating ceramic element surfaces of electronic components with resin, as described in JP 2004-500719A.

Coating the ceramic element surfaces of the electronic components can reduce the influence of chemical erosion on the ceramic elements, which is caused by plating solution in the case of plating or flux in the case of mounting. Further, coating the ceramic element surfaces can, in the case of plating, suppress the growth by plating onto the ceramic element surfaces, and reduce defective conductivity of the electronic component.

Furthermore, coating the ceramic element surfaces can prevent ingress of moisture, plating solutions, flux, etc. into the electronic components, and prevent reliability degradation of the electronic components, or electrical property degradation due to deposition by plating onto internal electrodes.

In addition, the formation of the coating film also shows the effect of improving the mechanical strength of the ceramic elements.

SUMMARY OF THE INVENTION

However, in the case of coating a ceramic element surface of an electronic component with resin as in JP2004-500719 A, film formation is not able to be selectively achieved only on the ceramic element surface, because the resin coating is provided (applied) over the entire surface of the electronic component. Therefore, there is a need for a step of forming a resin coating film over the entire surface of the electronic component before the formation of external electrodes, and removing the resin coating film on end surfaces of the electronic component on which external electrodes are to be formed, and the manufacturing cost is thus increased.

In addition, in the case of resin coating carried out after the formation of external electrodes, there is a need to apply a resin to each of predetermined ceramic element surfaces of an electric component by a method such as pattern printing, and the troublesome operation of forming the resin coating film results in expensiveness in manufacturing cost.

Therefore, an object of the present invention is to provide a ceramic electronic component which can have a coating film selectively formed only on a surface of the ceramic element of the ceramic electronic component, and a method for manufacturing the component.

The present invention provides a ceramic electronic component including a ceramic element, a coating film and an electrode provided on a surface of the ceramic element. The coating film is formed from a resin containing at least one anion of a sulfuric acid, a sulfonic acid, a carboxylic acid, a phosphoric acid, a phosphonic acid, and a hydrofluoric acid.

On the external electrode, a plated film may be formed.

In the present invention, the coating film is formed from a resin containing at least one anion of a sulfuric acid, a sulfonic acid, a carboxylic acid, a phosphoric acid, a phosphonic acid, and a hydrofluoric acid, and the coating film is selectively formed only on a surface of the ceramic element of the electronic component.

In addition, in the ceramic electronic component according to the present invention, the resin preferably has a thermal decomposition temperature of 240° C. or higher. Furthermore, the resin preferably includes at least one of an epoxy resin, a polyimide resin, a silicone resin, a polyamideimide resin, a polyetheretherketone resin, and a fluorine-containing resin. Thus, the ceramic electronic component has high heat resistance.

In addition, in the ceramic electronic component according to the present invention, the coating film preferably contains resin components cross-linked by heating. Thus, the coating film can be formed in a short period of time.

Furthermore, the present invention provides a ceramic electronic component including a ceramic element, a coating film and an electrode provided on a surface of the ceramic element, where the coating film is formed on the surface of the ceramic element by applying, to the surface of the ceramic element, a resin-containing solution containing at least one anion of a sulfuric acid, a sulfonic acid, a carboxylic acid, a phosphoric acid, a phosphoric acid, and a hydrofluoric acid, and the coating film is formed from a resin containing at least one anion of a sulfuric acid, a sulfonic acid, a carboxylic acid, a phosphoric acid, a phosphonic acid, and a hydrofluoric acid.

Furthermore, the present invention provides a method for manufacturing a ceramic electronic component including a ceramic element, a coating film and an electrode provided on a surface of the ceramic element, where a resin-containing solution containing at least one anion of a sulfuric acid, a sulfonic acid, a carboxylic acid, a phosphoric acid, a phosphonic acid, and a hydrofluoric acid is applied to the surface of the ceramic element, and a coating film formed from a resin containing at least one anion of a sulfuric acid, a sulfonic acid, a carboxylic acid, a phosphoric acid, a phosphonic acid, and a hydrofluoric acid is formed on the surface of the ceramic element.

Methods for providing the resin-containing solution to the surface of the ceramic element include methods such as immersion and application. In addition, the resin means a resin that is adjusted to have a polar group such as a carboxyl group and an amino group, and able to be, as an organic substance or a composite of organic and inorganic substances, dissolved or dispersed in an aqueous solvent.

Further, in the method for manufacturing a ceramic electronic component according to the present invention, the coating film may be formed on the surface of the ceramic element after forming an external electrode on the ceramic element. Alternatively, an external electrode may be formed on the ceramic element after forming the coating film on the surface of the ceramic element. Alternatively, the coating film may be formed on the surface of the ceramic element after forming an external electrode on the ceramic element and plating the surface of the external electrode.

The resin-containing solution according to the present invention, which is obtained by dispersing, in an aqueous solvent, the resin containing at least one anion of a sulfuric acid, a sulfonic acid, a carboxylic acid, a phosphoric acid, a phosphoric acid, and a hydrofluoric acid, has a component that etches (dissolves) the ceramic, and a component that reacts the dissolved ceramic ion with the resin component containing the anion.

In the present invention, the resin-containing solution containing the anion etches (dissolves) the ceramic element surface to ionize the constituent elements of the ceramic element. Then, the resin component containing the anion, which is dissolved (dispersed) in the resin-containing solution containing the anion, reacts with cationic elements among the ionized constituent elements of the ceramic element to neutralize the charge of the resin component containing the anion. As a result, the resin component containing the anion settles out along with cationic elements among the constituent elements of the ceramic element.

Specifically, the resin component containing the anion, which is stably dispersed in the aqueous solvent, reacts with the cationic elements among the constituent elements of the ceramic element to settle out through destabilization at the surface of the ceramic element.

The reaction between the ionized constituent elements of the ceramic element and the resin-containing solution containing the anion is likely to be developed at the surface of the ceramic element, and the reactants are thus believed to be immobilized to the surface of the ceramic element. In contrast, at the external electrode, because there is almost no etching reaction developed, fewer ionized constituent elements of the ceramic element will not develop any reaction with the resin-containing solution containing the anion. Therefore, the coating film is selectively deposited only on the surface of the ceramic element.

The resin reactant containing the anion, which is immobilized to the surface of the ceramic element, is in a gel state, and in close contact with the surface of the ceramic element, and the extra adhering resin-containing solution containing the anion can be thus washed away through a washing step after the treatment with the resin-containing solution containing the anion.

According to the present invention, the coating film can be selectively formed only on the surface of the ceramic element. Accordingly, the ceramic electronic component can be obtained whose manufacturing cost is inexpensive. In addition, the invention can be also adapted to the ceramic electronic component including electrodes which have a complex shape or microstructure, because the coating film is formed by chemical action.

In addition, the coating film will be formed on the surface of the ceramic element dissolved, because the surface of the ceramic element is dissolved by the etching component included in the resin-containing solution containing the anion. The dissolution of the surface of the ceramic element increases the surface asperity, and improves adhesion to the coating film.

The foregoing object, and other objects, features, and advantages of the invention will become more evident from the following description of embodiments, which will be provided with reference to the drawings.

DETAILED DESCRIPTION OF THE INVENTION

Embodiments of a ceramic electronic component and a manufacturing method therefor according to the present invention will be described.

1. Ceramic Electronic Component

A ceramic electronic component according to the present invention will be described with reference to a varistor as an example.

Figure 1:
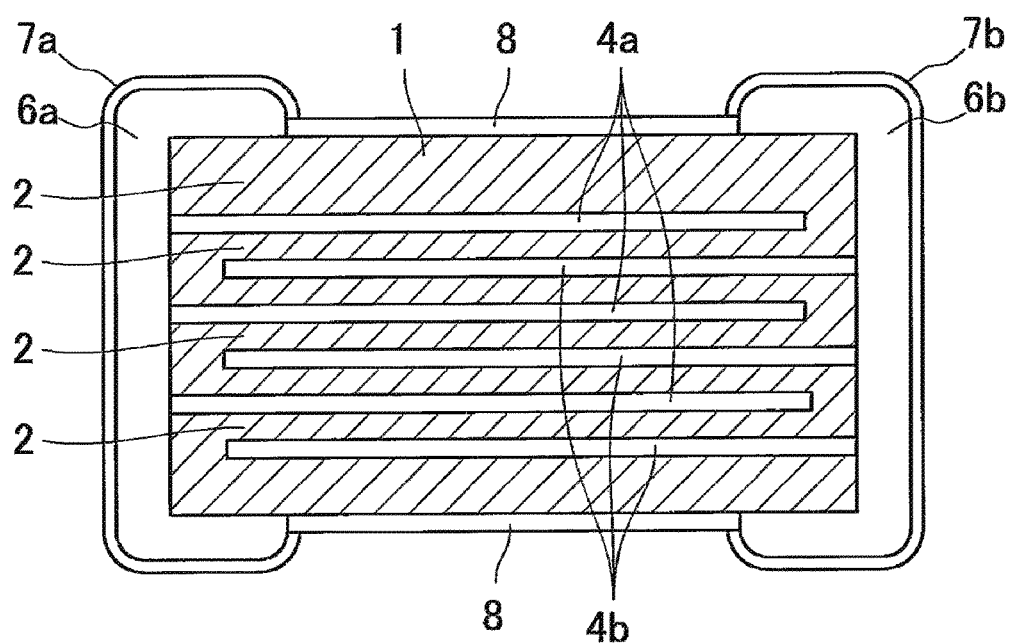
FIG. 1 is a cross-sectional view illustrating an embodiment of a ceramic electronic component according to the present invention.

FIG. 1 is a cross-sectional view illustrating a varistor 10 that is a ceramic electronic component according to the present invention. The varistor 10 includes a substantially cuboidal ceramic element 1, external electrodes 6a and 6b formed on right and left ends of the ceramic element 1, and a coating film 8 formed so as to cover four side surfaces of the ceramic element 1.

The ceramic element 1 is a laminated body obtained by stacking, in the thickness direction, two or more ceramic layers 2 and two or more pairs of internal electrodes 4a and 4b opposed to each other with the ceramic layers 2 interposed therebetween.

The ceramic layers 2 are made of a ceramic material in which $Bi_2O_3$ is present as a second phase at grain boundaries of a sintered body of ZnO crystal grains with Mn, Co, Sn, or Cr therein as a solid solution.

The internal electrodes 4a have ends extended to the left end surface of the ceramic element 1, and electrically connected to the external electrode 6a. The internal electrodes 4b have ends extended to the right end surface of the ceramic element 1, and electrically connected to the external electrode 6b. Thus, a varistor function is achieved at sites with the internal electrodes 4a and 4b opposed. The internal electrodes 4a and 4b are composed of Ag, Cu, Ni, Pd, or an alloy of the metals, etc.

The external electrodes 6a and 6b respectively have, on the surfaces thereof, plated films 7a and 7b formed. The plated films 7a and 7b protect the external electrodes 6a and 6b, and make solderability of the external electrodes 6a and 6b favorable.

On the surface of the ceramic element 1 excluding the regions with the external electrodes 6a and 6b, a coating film 8 is formed. The coating film 8 is formed from a resin containing at least one anion of a sulfuric acid, a sulfonic acid, a carboxylic acid, a phosphoric acid, a phosphoric acid, a hydrofluoric acid, and the like.

The resin included in the coating film 8 is a polyvinylidene chloride resin, an acrylic resin, an epoxy resin, a polyimide resin, a silicone resin, a polyamideimide resin a polyetheretherketone resin, a fluorine-containing resin, or the like. The varistor 10 typically undergoes a mounting step with soldering, and the coating film 8 thus preferably has high heat resistance (240° C. or higher). Accordingly, a resin is preferred which has a thermal decomposition temperature of 240° C. or higher. In this regard, there is a relationship of: (polyvinylidene chloride resin, acrylic resin)<epoxy resin< (polyimide resin, polyamideimide resin, polyetheretherketone resin, silicone resin, fluorine-containing resin) in terms of heat resistance.

In the thus configured varistor 10, the coating film 8 is formed from a resin containing at least one anion of a sulfuric acid, a sulfonic acid, a carboxylic acid, a phosphoric acid, a phosphoric acid, and a hydrofluoric acid, and the coating film 8 can be selectively formed only on the surface of the ceramic element of the varistor 10. Accordingly, the varistor 10 can be obtained whose manufacturing cost is inexpensive.

2. Method for Manufacturing Ceramic Electronic Component

Figure 2:
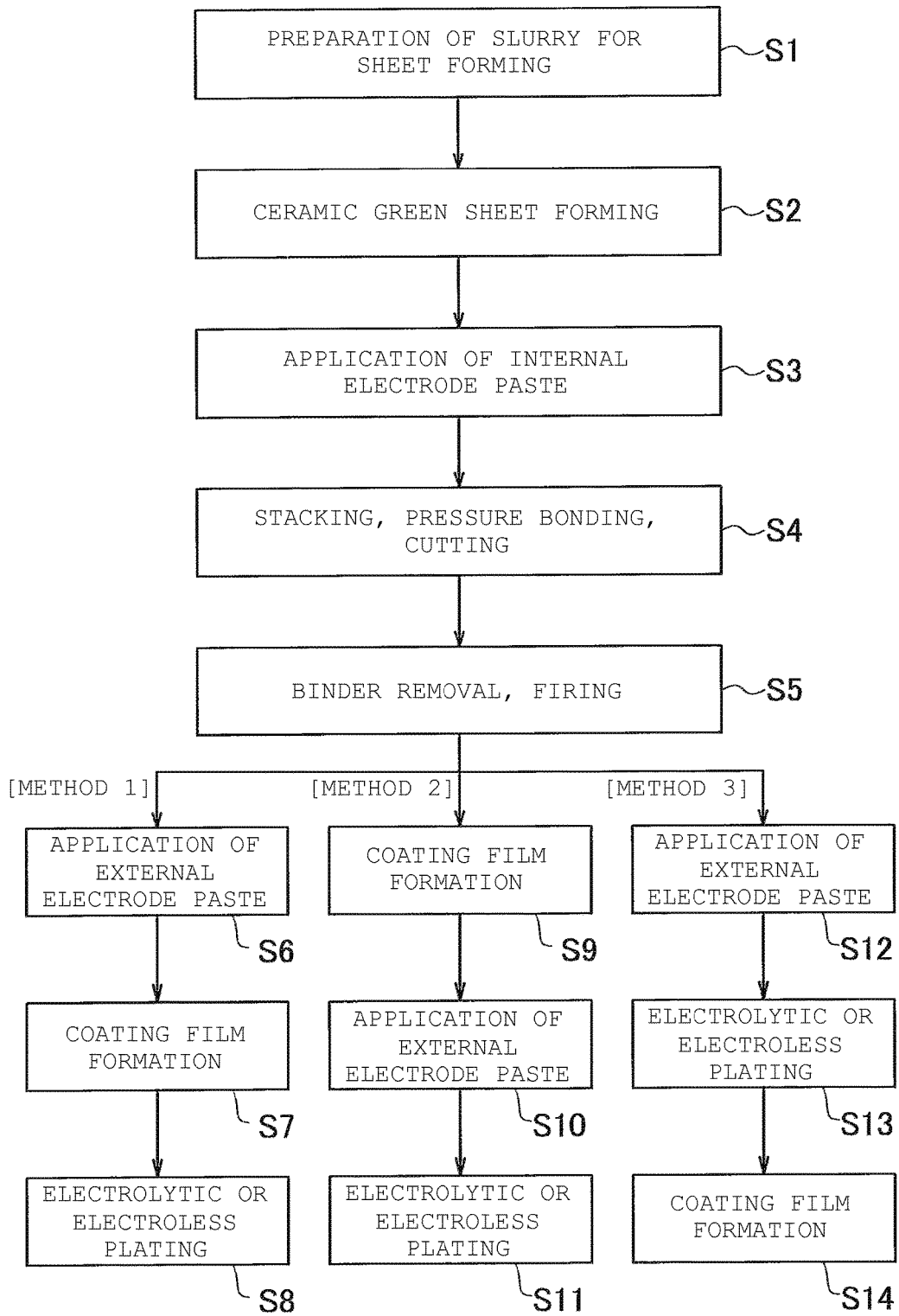
FIG. 2 is a flowchart showing an embodiment of a method for manufacturing the ceramic electronic component according to the present invention.

Next, a method for manufacturing the ceramic electronic component according to the present invention will be described with reference to the varistor 10 as an example. FIG. 2 is a flowchart showing a method for manufacturing the varistor 10.

In a step S1, an organic binder, a dispersant, a plasticizer, etc. are added to a ceramic material in which $Bi_2O_3$ is present as a second phase at grain boundaries of a sintered body of ZnO crystal grains with Mn, Co, Sn, or Cr therein as a solid solution, thereby preparing slurry for sheet forming.

Next, in a step S2, the slurry for sheet forming is formed into sheets by a doctor blade method to provide rectangular ceramic green sheets.

Next, in a step S3, an internal electrode paste containing Ag is applied onto the ceramic green sheets by a screen printing method to form electrode paste films to serve as the internal electrodes 4a and 4b.

Next, in a step S4, the multiple ceramic green sheets with the electrode paste films formed are stacked so as to alternate directions in which ends of the electrode paste films are extended, and subjected to pressure bonding. This laminated ceramic green sheet is cut into a size for individual ceramic elements 1 to provide a number of unfired ceramic elements 1.

Next, in a step S5, the unfired ceramic elements 1 are subjected to binder removal treatment at 400° C. to 500° C. Thereafter, the unfired ceramic elements 1 are subjected to firing for 2 hours at a temperature of 900° C. to 1000° C. to provide sintered ceramic elements 1. The ceramic green sheets and the electrode paste films are subjected to co-firing, and the ceramic green sheets serve as the ceramic layers 2, whereas the electrode paste films serve as the internal electrodes 4a and 4b.

Further, in the subsequent step, there are three types of manufacturing methods [Method 1] to [Method 3] shown.

In this regard, the resin-containing solution for use in [Method 1] to [Method 3] contains the anion. Used as the anion is at least one anion of a sulfuric acid, a sulfonic acid, a carboxylic acid, a phosphoric acid, a phosphoric acid, a hydrofluoric acid, and the like. Furthermore, methods for incorporating the anion into the (aqueous) resin-containing solution include, for example, a method of modifying molecules themselves of the resin component with the anion (JP 11-209458A), a method of mixing the anion as a surfactant (JP 6-329877A), and a method of mixing the anion as an etching agent (JP5-237457A).

(a) In the Case of [Method 1]

In the case of the manufacturing method [Method 1], in a step S6, an external electrode paste (AgPd alloy paste) is applied to both ends of the sintered ceramic element 1. Thereafter, on the sintered ceramic elements 1, the external electrode paste is baked at a temperature of 900° C. to form the external electrodes 6a and 6b electrically connected respectively to the internal electrodes 4a and 4b.

Next, in a step S7, to the ceramic elements 1, a resin-containing solution containing an anion is provided by an immersion method, or applied by spin coating. The resin-containing solution has the function of etching the surface of the ceramic element 1 to ionize the constituent elements of the ceramic elements 1, and includes a resin component containing an anion, which is dissolved or dispersed in an aqueous solvent. Furthermore, the resin-containing solution includes a neutralizer for dissolution or dispersion of the resin component containing the anion, and if necessary, a surfactant for reaction with cationic elements among the dissolved constituent elements of the ceramic elements. It is to be noted that after providing the resin-containing solution containing the anion, the ceramic element 1 is washed with a polar solvent such as pure water, if necessary.

Therefore, the resin-containing solution containing the anion etches (dissolves) the surface of the ceramic element 1 to ionize the constituent elements of the ceramic elements 1. In regard to the etching (dissolving) function of the resin-containing solution, the etching (dissolving) reaction can be developed just with the constituents of the resin-containing solution without adding any etching promoting constituent such as halogen, because the main constituent is ZnO in the case of the varistor 10. More specifically, the etching (dissolving) reaction proceeds when the pH of the resin-containing solution containing the anion is set in a pH range (pH<5, pH>11) in which Zn is present stably as ions.

Then, the resin component containing the anion, which is dissolved (dispersed) in the resin-containing solution reacts with cationic elements among the ionized constituent elements of the ceramic element 1 to neutralize the charge of the resin component containing the anion. As a result, the resin component containing the anion settles out along with cationic elements among the constituent elements of the ceramic element 1, and selectively deposits only on the surface of the ceramic element. Accordingly, in the deposited resin component containing the anion, cationic elements are incorporated among the dissolved and ionized constituent elements of the ceramic element 1.

On the other hand, the resin component containing the anion is not deposited on the parts with the external electrodes 6a and 6b formed. In this case, at the interfaces between the ceramic elements 1 and the external electrodes 6a and 6b, the resin component containing the anion may slightly extend on the surfaces of the external electrodes 6a and 6b. This is believed to be the resin component containing the anion, deposited on the surface of the ceramic element, which slightly extends to the external electrodes 6a and 6b, rather than the deposition reaction proceeding at the surfaces of the external electrodes 6a and 6b.

The resin included in the resin-containing solution is a polyvinylidene chloride resin, an acrylic resin, an epoxy resin, a polyimide resin, a silicone resin, a polyamideimide resin a polyetheretherketone resin, a fluorine-containing resin, or the like, but basically, it does not matter what kind as long as the resin is deposited by the present treatment.

In this way, the coating film 8 formed from the resin containing the anion is formed on the surface of the ceramic element. Thereafter, the coating film 8 is subjected to heating treatment. The heating treatment is intended to accelerate a cross-linking reaction between the resin components in the resin-containing solution deposited, and the heating condition varies depending on the type of the resin component. In general, the cross-linking reaction is likely to proceed under high temperature. However, the excessively increased temperature increases the decomposition reaction of the resin component. Accordingly, there is a need to set optimum temperature and time in accordance with the resin component.

Figure 3:
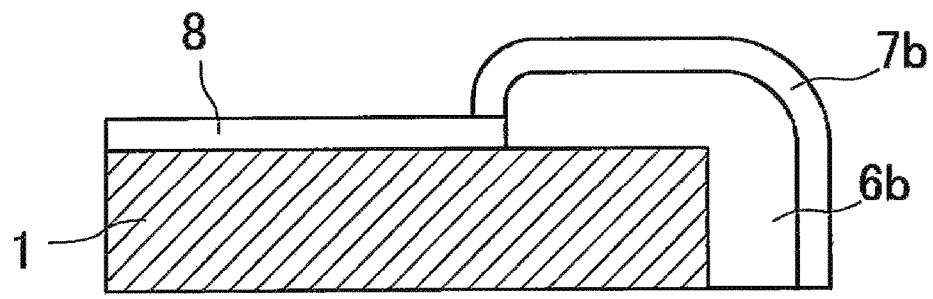
FIG. 3 is an enlarged cross-sectional view of an external electrode.

Next, in a step S8, the plated films 7a and 7b are formed on the external electrodes 6a and 6b by an electrolytic or electroless plating method. The plated films 7a and 7b adopt, for example, a double structure composed of a Ni plated film as a lower layer and an Sn plated film as an upper layer. FIG. 3 is an enlarged cross-sectional view of a site with the external electrode 6b formed by the manufacturing method [Method 1].

In this way, the coating film 8 can be selectively formed only on the surface of the ceramic element. Accordingly, the varistor 10 whose manufacturing cost is inexpensive can be manufactured with favorable mass productivity. In addition, the method can be also adapted to the varistor 10 including the external electrodes 6a and 6b which have a complex shape or microstructure, because the coating film 8 is formed by chemical action.

(b) In the Case of [Method 2]

In addition, in the case of the manufacturing method [Method 2], in a step S9, to the ceramic elements 1, a resin-containing solution containing an anion is provided by an immersion method, or applied by spin coating. The resin-containing solution containing the anion etches (dissolves) the surfaces of the ceramic elements 1 to ionize the constituent elements of the ceramic elements 1. Then, the resin component containing the anion, which is dissolved (dispersed) in the resin-containing solution, reacts with cationic elements among the ionized constituent elements of the ceramic elements 1 to neutralize the charge of the resin component containing the anion. As a result, the resin component containing the anion settles out along with cationic elements among the constituent elements of the ceramic elements 1, and deposits over substantially the entire surface of the ceramic element 1. Accordingly, in the deposited resin component containing the anion, cationic elements are incorporated among the dissolved and ionized constituent elements of the ceramic elements 1. It is to be noted that after providing the resin-containing solution containing the anion, the ceramic elements 1 is washed with a polar solvent such as pure water, if necessary.

In this way, the coating film 8 formed from the resin containing the anion is formed over substantially the entire surfaces of the ceramic elements 1. Thereafter, the coating film 8 is subjected to heating treatment. It is to be noted that the coating film 8 is not formed on extensions of the internal electrodes 4a and 4b, which are exposed at both right and left end surfaces of the ceramic elements 1, in this case.

Next, in a step S10, an external electrode paste is applied to both ends of the ceramic elements 1.

Thereafter, on the ceramic elements 1, the external electrodes 6a and 6b electrically connected respectively to the internal electrodes 4a and 4b are formed at a temperature at which the coating film 8 undergoes no thermal decomposition.

Figure 4:
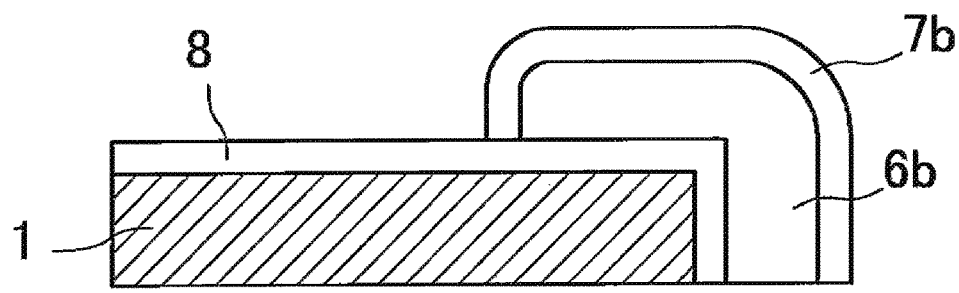
FIG. 4 is an enlarged cross-sectional view of an external electrode of another ceramic electronic component.

Next, in a step S11, the plated films 7a and 7b are formed on the external electrodes 6a and 6b by an electrolytic or electroless plating method. FIG. 4 is an enlarged cross-sectional view of a site with the external electrode 6b formed by the manufacturing method [Method 2].

(c) In the Case of [Method 3]

In addition, in the case of the manufacturing method [Method 3], in a step S12, an external electrode paste is applied to both ends of the ceramic elements 1. Thereafter, on the ceramic elements 1, the external electrode paste is baked at a temperature of 900° C. to form the external electrodes 6a and 6b electrically connected respectively to the internal electrodes 4a and 4b.

Next, in a step S13, the plated films 7a and 7b are formed on the external electrodes 6a and 6b by an electrolytic or electroless plating method.

Next, in a step S14, to the ceramic elements 1, a resin-containing solution containing an anion is provided by an immersion method, or applied by spin coating. The resin-containing solution containing the anion etches (dissolves) the surface of the ceramic element 1 to ionize the constituent elements of the ceramic element 1. Then, the resin component containing the anion, which is dissolved (dispersed) in the resin-containing solution, reacts with cationic elements among the ionized constituent elements of the ceramic element 1 to neutralize the charge of the resin component containing the anion. As a result, the resin component containing the anion settles out along with cationic elements among the constituent elements of the ceramic element 1, and selectively deposits only on the surface of the ceramic element. Accordingly, in the deposited resin component containing the anion, cationic elements are incorporated among the dissolved and ionized constituent elements of the ceramic element 1. On the other hand, the resin component containing the anion is not deposited on the parts with the external electrodes 6a and 6b formed. It is to be noted that after providing the resin-containing solution containing the anion, the ceramic element 1 is washed with a polar solvent such as pure water, if necessary.

Figure 5:
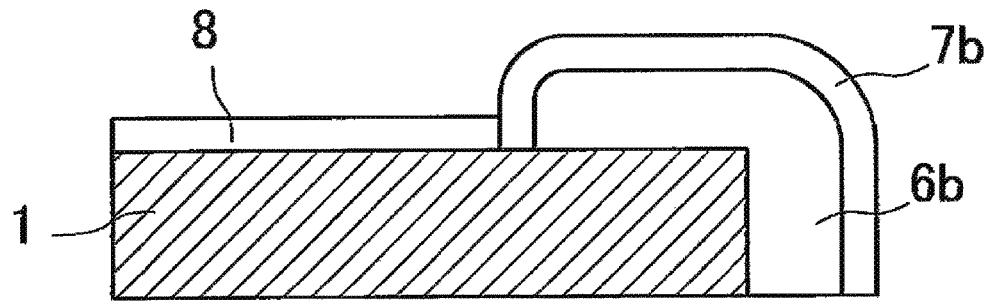
FIG. 5 is an enlarged cross-sectional view of an external electrode of another ceramic electronic component.

In this way, the coating film 8 formed from the resin containing the anion is formed on the surface of the ceramic element 1. Thereafter, the coating film 8 is subjected to heating treatment. FIG. 5 is an enlarged cross-sectional view of a site with the external electrode 6b formed by the manufacturing method [Method 3].

Next, ceramic electronic components according to the present invention will be described with reference to a multilayer ceramic capacitor, a laminated coil, a PTC thermistor, an NTC thermistor, and an LTCC substrate as examples other than varistors.

(a) Multilayer Ceramic Capacitor

The multilayer ceramic capacitor that is a ceramic electronic component according to the present invention has the same structure as the varistor 10 shown in FIG. 1, and detailed descriptions thereof will be thus left out.

This multilayer ceramic capacitor has a coating film formed on a surface of the ceramic element excluding the regions with external electrodes. The coating film is formed from a resin containing at least one anion of a sulfuric acid, a sulfonic acid, a carboxylic acid, a phosphoric acid, a phosphoric acid, a hydrofluoric acid and the like, and selectively formed only on the surface of the ceramic element of the multilayer ceramic capacitor.

Ceramic layers constituting the ceramic element are composed of a ceramic material of $Pb(Mg, Nb)O_3$—$PbTiO_3$—$Pb(Cu, W)$—$ZnO$—$MnO_2$ as a main constituent mixed with $Li_2O$—$BaO$—$B_2O_3$—$SiO_2$ as an anti-reducing agent, or a ceramic material containing $CaZrO_3$—$CaTiO_3$ as its main constituent. Therefore, among the constituent elements of the ceramic elements, which are contained in the coating films, the cationic elements include Pb, Mg, Nb, Ti, Ba, Li, Zn, Mn, Si, Ca, and Zr each eluted and deposited from $Pb(Mg, Nb)O_3$—$PbTiO_3$—$Pb(Cu, W)$—$ZnO$—$MnO_2$, $Li_2O$—$BaO$—$B_2O_3$—$SiO_2$, $CaZrO_3$—$CaTiO_3$, or the like of the ceramic layers.

The resin included in the coating film is, as in the case of the varistor, a polyvinylidene chloride resin, an acrylic resin, an epoxy resin, a polyimide resin, a silicone resin, a polyamideimide resin a polyetheretherketone resin, a fluorine-containing resin, or the like.

(b) Laminated Coil

The laminated coil that is a ceramic electronic component according to the present invention has the same structure as well-known laminated coils, and detailed descriptions thereof will be thus left out.

This laminated coil has a coating film formed on a surface of the ceramic element excluding the regions with external electrodes. The coating film is formed from a resin containing at least one anion of a sulfuric acid, a sulfonic acid, a carboxylic acid, a phosphoric acid, a phosphoric acid, a hydrofluoric acid and the like and selectively formed only on the surface of the ceramic element of the laminated coil.

Ceramic layers constituting a ceramic element are composed of a magnetic ceramic material such as a Cu—Zn ferrite and a Ni—Zn ferrite. Therefore, among the constituent elements of the ceramic element, which are contained in the coating films, the cationic elements include Sr, Sn, Fe, Ni, Cu, Zn, Mn, and Co each eluted and deposited from the Cu—Zn ferrite, Ni—Zn ferrite, or the like of the ceramic layers.

The resin included in the coating film is, as in the case of the varistor, a polyvinylidene chloride resin, an acrylic resin, an epoxy resin, a polyimide resin, a silicone resin, a polyamideimide resin a polyetheretherketone resin, a fluorine-containing resin, or the like.

(c) PTC Thermistor and NTC Thermistor

The PTC thermistor and NTC thermistor that are ceramic electronic components according to the present invention has the same structure as well-known thermistors, and detailed descriptions thereof will be thus left out.

This PTC thermistor and the NTC thermistor have coating films formed on the surface of the ceramic element excluding the regions with external electrodes. The coating film is formed from a resin containing at least one anion of a sulfuric acid, a sulfonic acid, a carboxylic acid, a phosphoric acid, a phosphoric acid, a hydrofluoric acid and the like, and selectively formed only on the surface of the ceramic element of the PTC thermistor and NTC thermistor.

Ceramic layers constituting a ceramic element of the PTC thermistor are composed of, for example, a ceramic material of $BaTiO_3$ as a main constituent with $Y_2O_3$ as a semiconducting agent, $SiO_2$ and $Al_2O_3$ as a curing agent, and $MnO_2$ as a property improving agent each added thereto and mixed therein. Therefore, among the constituent elements of the ceramic elements, which are contained in the coating films of the PTC thermistors, the cationic elements include Ba, Ti, Y, Si, and Mn each eluted and deposited from $BaTiO_3$, $Y_2O_3$, $SiO_2$, $Al_2O_3$, or $MnO_2$ of the ceramic layers.

On the other hand, ceramic layers constituting a ceramic element of the NTC thermistor are composed of, for example, a ceramic material of $Mn_3O_4$, NiO, $Co_2O_3$, etc. mixed. Therefore, among the constituent elements of the ceramic elements, which are contained in the coating films of the NTC thermistors, the cationic elements include Mn, Ni, and Co each eluted and deposited from $Mn_3O_4$, NiO, $Co_2O_3$, or the like of the ceramic layers.

The resin included in the coating film is, as in the case of the varistor, a polyvinylidene chloride resin, an acrylic resin, an epoxy resin, a polyimide resin, a silicone resin, a polyamideimide resin a polyetheretherketone resin, a fluorine-containing resin, or the like.

(d) LTCC Substrate (Low Temperature Co-Fired Ceramics Multilayer Substrate)

Figure 6:
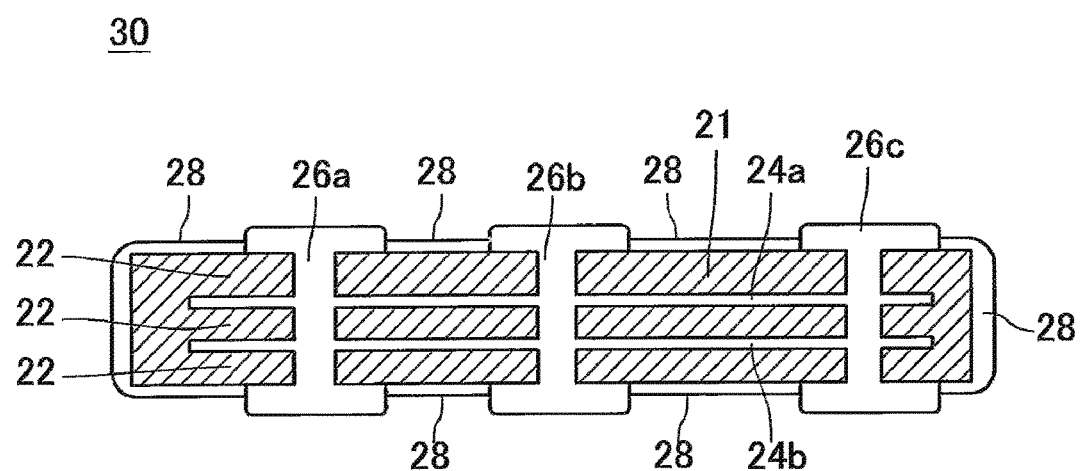
FIG. 6 is a cross-sectional view illustrating another embodiment of a ceramic electronic component according to the present invention.

FIG. 6 is a cross-sectional view illustrating an LTCC substrate 30 that is a ceramic electronic component according to the present invention. The LTCC substrate 30 includes a ceramic element 21, through-hole electrodes 26a, 26b, and 26c formed in the ceramic element 21, and a coating film 28 formed so as to cover the ceramic element 21.

The ceramic element 21 is a laminated body obtained by stacking a number of ceramic layers 22 and a number of internal circuit electrode layers 24a and 24b in the thickness direction. The through-hole electrodes 26a, 26b, and 26c electrically connect the internal circuit electrode layers 24a and 24b and the front and back surfaces of the ceramic element 21.

The ceramic layers 22 are composed of a ceramic material of LTCC (for example, crystallized glass mixed with $Al_2O_3$, $ZrSiO_4$, or the like).

The through-hole electrodes 26a, 26b, and 26c have, if necessary, a plated film formed on the surfaces thereof.

On the surface of the ceramic element 21 excluding the regions with the through-hole electrodes 26a, 26b, and 26c, the coating film 28 is formed. The coating film 28 is formed from a resin containing at least one anion of a sulfuric acid, a sulfonic acid, a carboxylic acid, a phosphoric acid, a phosphoric acid, a hydrofluoric acid and the like.

Moreover, cationic elements among the constituent elements of the ceramic element 21, which are contained in the coating film 28, are deposited by partial elution from the ceramic layers 22. More specifically, the cationic elements among the constituent elements of the ceramic element 21 include Si, Al, B, and Ca each deposited by elution from the ceramic material of LTCC in the ceramic layers 22.

The resin included in the coating film is, as in the case of the varistor, a polyvinylidene chloride resin, an acrylic resin, an epoxy resin, a polyimide resin, a silicone resin, a polyamideimide resin a polyetheretherketone resin, a fluorine-containing resin, or the like.

In the thus configured LTCC substrate 30, the coating film 28 is formed from a resin containing at least one anion of a sulfuric acid, a sulfonic acid, a carboxylic acid, a phosphoric acid, a phosphoric acid, and a hydrofluoric acid, and the coating film 28 can be selectively formed only on the surface of the ceramic element of the LTCC substrate 30. Accordingly, the LTCC substrate 30 can be obtained whose manufacturing cost is inexpensive.

EXAMPLES

1. Examples and Comparative Examples

Respective ceramic electronic components (varistors, multilayer ceramic capacitors, laminated coils, PTC thermistors, NTC thermistors, LTCC substrates) according to examples and comparative examples were prepared, and subjected to characterization.

2. Preparation of Examples and Comparative Examples (a) Examples 1 to 14

As shown in Table 1, the varistor 10 with the coating film 8 provided on the surface of the ceramic element 1 was prepared by the manufacturing method [Method 1] according to the embodiment described previously.

As the resin-containing solution, a commercially available latex of a resin component dispersed in an aqueous solvent was used with an etching promoting constituent and a surfactant added thereto, if necessary.

As the resin-containing solutions according to Examples 1 to 3, an acrylic resin (Trade Name: Nipol LX814A (from Zeon Corporation)) as the resin component was used through the adjustment of the pH to 2.0, 3.0, and 4.0 respectively with the addition of a sulfuric acid as the etching promoting constituent to the resin.

As the resin-containing solutions according to Examples 4 to 6, an acrylic resin (Trade Name: Nipol LX814A (from Zeon Corporation)) as the resin component was used through the adjustment of the pH to 2.0, 3.0, and 4.0 respectively with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solution according to Example 7, a polyvinylidene chloride resin (Trade Name: Saran Latex L232A (from Asahi Kasei Chemicals Corp.)) as the resin component was used through the addition of a 10% sulfuric acid as the etching promoting constituent thereto for a concentration of 1 vol % and the adjustment of the pH to 3.0 with a potassium hydroxide solution.

As the resin-containing solution according to Example 8, a product of polyvinylidene chloride resin (Trade Name: Saran Latex L232A (from Asahi Kasei Chemicals Corp.)) as the resin component was used without being adjusted (pH: 2.0).

As the resin-containing solution according to Example 9, a silicone resin (Trade Name: X-51-1318 (from Shin-Etsu Chemical Co., Ltd.)) as the resin component was used through the adjustment of the pH to 3.0 with the addition of a sulfuric acid as the etching promoting constituent to the resin.

As the resin-containing solution according to Example 10, a silicone resin (Trade Name: X-51-1318 (from Shin-Etsu Chemical Co., Ltd.)) as the resin component was used through the adjustment of the pH to 3.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solution according to Example 11, an acrylic resin (Trade Name: Nipol LX814A (from Zeon Corporation)) was used through the adjustment of the pH to 4.0 with the addition of a hydrochloric acid as the etching promoting constituent to the resin.

As the resin-containing solution according to Example 12, an acrylic resin (Trade Name: Nipol LX814A (from Zeon Corporation)) was used through the adjustment of the pH to 4.0 with the addition of a hydrochloric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solution according to Example 13, an acrylic resin (Trade Name: Nipol LX814A (from Zeon Corporation)) was used through the adjustment of the pH to 4.0 with the addition of a nitric acid as the etching promoting constituent to the resin.

As the resin-containing solution according to Example 14, an acrylic resin (Trade Name: Nipol LX814A (from Zeon Corporation)) was used through the adjustment of the pH to 4.0 with the addition of a nitric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

The coating film 8 was formed on the surface of the ceramic element 1 in such a way that the ceramic element 1 was immersed for 3 minutes in the resin-containing solution at room temperature, then washed with pure water, and subjected to heat treatment at 80° C. to 150° C. for 30 minutes.

(b) Examples 15 to 39

As shown in Table 1, multilayer ceramic capacitors (Examples 15, 20, 25, 30, and 35), laminated coils (Examples 16, 21, 26, 31, and 36), PTC thermistors (Examples 17, 22, 27, 32, and 37), NTC thermistors (Examples 18, 23, 28, 33, and 38), and LTCC substrates (Examples 19, 24, 29, 34, and 39) with the coating film provided on the surfaces of respective ceramic elements were prepared by the manufacturing method [Method 1] according to the present embodiment.

As the resin-containing solutions according to Examples 15 to 19, an acrylic resin (Trade Name: Nipol LX814A (from Zeon Corporation)) as the resin component was used through the adjustment of the pH to 3.0 with the addition of a sulfuric acid as the etching promoting constituent to the resin.

As the resin-containing solutions according to Examples 20 to 24, an acrylic resin (Trade Name: Nipol LX814A (from Zeon Corporation)) as the resin component was used through the adjustment of the pH to 3.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solutions according to Examples 25 to 29, an epoxy resin (Trade Name: MODEPICS 302 (from Arakawa Chemical Industries, Ltd.)) as the resin component was used through the adjustment of the pH to 3.0 with the addition of a sulfuric acid as the etching promoting constituent to the resin. To this resin, 5 vol % of NEWREX (registered trademark, from NOF Corporation) was added as a surfactant. The resin-containing solution was adjusted so as to have a solid content concentration of 10 wt %.

As the resin-containing solutions according to Examples 30 to 34, a silicone resin (Trade Name: POLON-MF-56 (from Shin-Etsu Chemical Co., Ltd.)) as the resin component was used through the adjustment of the pH to 3.0 with the addition of a sulfuric acid as the etching promoting constituent to the resin. To this resin, 5 vol % of NEWREX (registered trademark, from NOF Corporation) was added as a surfactant. The resin-containing solution was adjusted so as to have a solid content concentration of 10 wt %.

As the resin-containing solutions according to Examples 35 to 39, an acrylic resin (Trade Name: Nipol SX-1706A (from Zeon Corporation)) as the resin component was used through the adjustment of the pH to 3.0 with the addition of a sulfuric acid as the etching promoting constituent to the resin. To this resin, 5 vol % of NEWREX (registered trademark, from NOF Corporation) was added as a surfactant. The resin-containing solution was adjusted so as to have a solid content concentration of 10 wt %.

The coating film was formed on the surface of the ceramic element in such a way that the ceramic element was immersed for 10 minutes in the resin-containing solution at room temperature, then washed with pure water, and subjected to heat treatment at 80° C. to 150° C. for 30 minutes.

(c) Comparative Examples 1 to 6

As shown in Table 1, a varistor (Comparative Example 1), a multilayer ceramic capacitor (Comparative Example 2), a laminated coil (Comparative Example 3), a PTC thermistor (Comparative Example 4), an NTC thermistor (Comparative Example 5), and an LTCC substrate (Comparative Example 6) were prepared without any coating films formed on the surfaces of ceramic elements.

3. Characterization and Evaluation Methods in Examples and Comparative Examples

The prepared ceramic electronic components according to Examples 1 to 39 and Comparative Examples 1 to 6 were subjected to the following characterization.

(a) Non-Deposition of Plating on Ceramic Element Part (Selective Deposition)

The deposition by electrolytic plating on the surface (the region excluding the external electrodes, but including the surface of the coating film) of the ceramic element part was determined by visual check of the appearance after electrolytic Ni plating and electrolytic Sn plating. The case where there was no deposition by electrolytic plating on the surface of the ceramic element part was regarded as "○". The case of island-shaped deposition by electrolytic plating on the surface of the ceramic element part, or the case of projecting deposition by electrolytic plating, extending from an end of the external electrode to the ceramic element, was regarded as "Δ". The case of deposition by electrolytic plating over the entire surface of the ceramic element part was regarded as "x".

(b) Plating Adhesion

The plating adhesion was determined by visual examination of the appearance after electrolytic Ni plating and electrolytic Sn plating. This evaluation of plating adhesion also involves the evaluation on no coating film formed on the external electrodes. The case of adhesion by electrolytic plating over the entire surfaces of the external electrodes was regarded as "○". The case where there was at least partially no adhesion by electrolytic plating on the surfaces of the external electrodes was regarded as "x".

4. Characterization Results in Examples and Comparative Examples

Table 1 shows the results of the characterization of Examples 1 to 39 and Comparative Examples 1 to 6.

TABLE 1

| | | Electronic Component | Coating Film | Resin-Containing Solution | pH | Immersion Time | Non-Deposition by Plating on Ceramic Part | Plating Adhesion |
|---|---|---|---|---|---|---|---|---|
| Example | 1 | Varistor | Yes | Acrylic Resin + Sulfuric Acid | 2.0 | 3 minutes | ○ | ○ |
| | 2 | | | | 3.0 | | ○ | ○ |
| | 3 | | | | 4.0 | | ○ | ○ |
| | 4 | | | Acrylic Resin + Sulfuric Acid + Surfactant | 2.0 | | ○ | ○ |
| | 5 | | | | 3.0 | | ○ | ○ |
| | 6 | | | | 4.0 | | ○ | ○ |
| | 7 | | | Polyvinylidene Chloride Resin + Sulfuric Acid | 3.0 | | ○ | ○ |
| | 8 | | | Polyvinylidene Chloride Resin | 2.0 | | ○ | ○ |
| | 9 | | | Silicone Resin + Sulfuric Acid | 3.0 | | ○ | ○ |
| | 10 | | | Silicone Resin + Sulfuric Acid + Surfactant | 3.0 | | ○ | ○ |
| | 11 | | | Acrylic Resin + Hydrochloric Acid | 4.0 | | ○ | ○ |
| | 12 | | | Acrylic Resin + Hydrochloric Acid + Surfactant | 4.0 | | ○ | ○ |
| | 13 | | | Acrylic Resin + Nitric Acid | 4.0 | | ○ | ○ |
| | 14 | | | Acrylic Resin + Nitric Acid + Surfactant | 4.0 | | ○ | ○ |
| | 15 | Multilayer Ceramic Capacitor | Yes | Acrylic Resin + Sulfuric Acid | 3.0 | 10 minutes | ○ | ○ |
| | 16 | Laminated Coil | | | | | ○ | ○ |
| | 17 | PTC Thermistor | | | | | ○ | ○ |
| | 18 | NTC Thermistor | | | | | ○ | ○ |
| | 19 | LTCC Substrate | | | | | ○ | ○ |
| | 20 | Multilayer Ceramic Capacitor | Yes | Acrylic Resin + Sulfuric Acid + Surfactant | 3.0 | | ○ | ○ |
| | 21 | Laminated Coil | | | | | ○ | ○ |
| | 22 | PTC Thermistor | | | | | ○ | ○ |
| | 23 | NTC Thermistor | | | | | ○ | ○ |
| | 24 | LTCC Substrate | | | | | ○ | ○ |
| | 25 | Multilayer Ceramic Capacitor | Yes | Epoxy Resin + Sulfuric Acid + Surfactant | 3.0 | | ○ | ○ |
| | 26 | Laminated Coil | | | | | ○ | ○ |
| | 27 | PTC Thermistor | | | | | ○ | ○ |
| | 28 | NTC Thermistor | | | | | ○ | ○ |
| | 29 | LTCC Substrate | | | | | ○ | ○ |
| | 30 | Multilayer Ceramic Capacitor | Yes | Silicone Resin + Sulfuric Acid + Surfactant | 3.0 | | ○ | ○ |
| | 31 | Laminated Coil | | | | | ○ | ○ |
| | 32 | PTC Thermistor | | | | | ○ | ○ |
| | 33 | NTC Thermistor | | | | | ○ | ○ |

TABLE 1-continued

|  | | Electronic Component | Coating Film | Resin-Containing Solution | pH | Immersion Time | Non-Deposition by Plating on Ceramic Part | Plating Adhesion |
|---|---|---|---|---|---|---|---|---|
|  | 34 | LTCC Substrate |  |  |  |  | ○ | ○ |
|  | 35 | Multilayer Ceramic Capacitor | Yes | Acrylic Resin + Sulfuric Acid + Surfactant | 3.0 |  | ○ | ○ |
|  | 36 | Laminated Coil |  |  |  |  | ○ | ○ |
|  | 37 | PTC Thermistor |  |  |  |  | ○ | ○ |
|  | 38 | NTC Thermistor |  |  |  |  | ○ | ○ |
|  | 39 | LTCC Substrate |  |  |  |  | ○ | ○ |
| Comparative Example | 1 | Varistor | No | — | — | — | x | ○ |
|  | 2 | Multilayer Ceramic Capacitor |  |  |  |  | Δ | ○ |
|  | 3 | Laminated Coil |  |  |  |  | x | ○ |
|  | 4 | PTC Thermistor |  |  |  |  | x | ○ |
|  | 5 | NTC Thermistor |  |  |  |  | x | ○ |
|  | 6 | LTCC Substrate |  |  |  |  | Δ | ○ |

From Table 1, it is determined that the non-deposition by plating on the ceramic element part is disadvantageous even with favorable plating adhesion in the case of Comparative Examples 1 to 6 (in the case of the ceramic electronic components without any coating film formed).

On the other hand, it is determined that the non-deposition by plating on the ceramic element part and the plating adhesion are both favorable in the case of Examples 1 to 39 (in the case of the ceramic electronic components with the coating films formed).

It is to be noted that the invention is not to be considered limited to the previously described embodiments, but can be modified variously within the scope of the invention.

What is claimed is:

1. A ceramic electronic component comprising:
a ceramic element with internal electrodes that have extensions thereof exposed from the ceramic element;
a coating film on a surface of the ceramic element; and
an electrode on the surface of the ceramic element,
wherein the coating film includes a resin containing at least one anion of a sulfuric acid, a sulfonic acid, a carboxylic acid, a phosphoric acid, a phosphonic acid, and a hydrofluoric acid,
wherein the coating film does not cover the extensions of the internal electrodes exposed from the ceramic element,
wherein the coating film is located on at least a portion of the surface of the ceramic element not covered by the electrode, and
at least a part of the coating film is exposed at the surface of the ceramic electronic component.

2. The ceramic electronic component according to claim 1, wherein the resin has a thermal decomposition temperature of 240° C. or higher.

3. The ceramic electronic component according to claim 1, wherein the resin comprises at least one of an epoxy resin, a polyimide resin, a silicone resin, a polyamideimide resin, a polyetheretherketone resin, and a fluorine-containing resin.

4. A ceramic electronic component comprising:
a ceramic element;
a coating film on a surface of the ceramic element; and
an electrode on the surface of the ceramic element,
wherein the coating film includes a resin containing at least one anion of a sulfuric acid, a sulfonic acid, a carboxylic acid, a phosphoric acid, a phosphonic acid, and a hydrofluoric acid, and
wherein the coating film contains cross-linked resin components.

5. The ceramic electronic component according to claim 1, further comprising a plated film on the electrode.

6. The ceramic electronic component according to claim 1, wherein the coating film is formed on the surface of the ceramic element by applying, to the surface of the ceramic element, a resin-containing solution containing the at least one anion of the sulfuric acid, the sulfonic acid, the carboxylic acid, the phosphoric acid, the phosphonic acid, and the hydrofluoric acid.

7. The ceramic electronic component according to claim 4, wherein the resin has a thermal decomposition temperature of 240° C. or higher.

8. The ceramic electronic component according to claim 4, wherein the resin comprises at least one of an epoxy resin, a polyimide resin, a silicone resin, a polyamideimide resin, a polyetheretherketone resin, and a fluorine-containing resin.

9. The ceramic electronic component according to claim 4, further comprising a plated film on the electrode.

10. The ceramic electronic component according to claim 4, wherein the coating film is formed on the surface of the ceramic element by applying, to the surface of the ceramic element, a resin-containing solution containing the at least one anion of the sulfuric acid, the sulfonic acid, the carboxylic acid, the phosphoric acid, the phosphonic acid, and the hydrofluoric acid.

* * * * *